United States Patent
Snider et al.

(10) Patent No.: US 8,387,457 B2
(45) Date of Patent: Mar. 5, 2013

(54) COLLISION SENSOR HOUSING AND MODULE

(75) Inventors: Chris R. Snider, Noblesville, IN (US); Charles A. Cluff, Zionsville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/209,993

(22) Filed: Aug. 15, 2011

(65) Prior Publication Data

US 2012/0174669 A1 Jul. 12, 2012

Related U.S. Application Data

(60) Provisional application No. 61/431,545, filed on Jan. 11, 2011.

(51) Int. Cl.
*G01D 11/24* (2006.01)
(52) U.S. Cl. ........................................... 73/431
(58) Field of Classification Search ...................... 73/431
See application file for complete search history.

(56) References Cited

U.S. PATENT DOCUMENTS

| | | | | |
|---|---|---|---|---|
| 4,392,701 A * | 7/1983 | Weidler | ......................... | 439/76.1 |
| 4,781,600 A * | 11/1988 | Sugiyama et al. | ............... | 439/45 |
| 5,008,487 A * | 4/1991 | Shimmyo | ..................... | 174/373 |
| 5,097,978 A * | 3/1992 | Eckerd | ............................ | 220/315 |
| 5,265,471 A * | 11/1993 | Kawauchi et al. | ............... | 73/493 |
| 6,388,887 B1 * | 5/2002 | Matsumoto et al. | ........... | 361/760 |
| 6,728,110 B2 * | 4/2004 | Koyama | ......................... | 361/752 |
| 6,816,381 B2 * | 11/2004 | Takeuchi | ....................... | 361/752 |
| 7,147,486 B2 * | 12/2006 | Clark | ........................... | 439/76.1 |
| 7,245,497 B2 * | 7/2007 | Klein et al. | ..................... | 361/752 |
| 7,510,404 B2 * | 3/2009 | Koyama | ......................... | 439/76.1 |
| 7,849,740 B2 * | 12/2010 | Nichol | ............................ | 73/493 |
| 8,144,476 B2 * | 3/2012 | Hirose | ........................... | 361/752 |
| 2009/0314081 A1 * | 12/2009 | Christoph et al. | ............... | 73/431 |
| 2010/0182757 A1 * | 7/2010 | Hiros | .............................. | 361/752 |
| 2010/0253188 A1 * | 10/2010 | Koyama | ...................... | 312/223.1 |
| 2011/0077820 A1 * | 3/2011 | Tokui et al. | ...................... | 701/36 |
| 2011/0216487 A1 * | 9/2011 | Sakai | ......................... | 361/679.01 |
| 2012/0026703 A1 * | 2/2012 | Nomoto | ......................... | 361/752 |

* cited by examiner

*Primary Examiner* — Lisa Caputo
*Assistant Examiner* — Jamel Williams
(74) *Attorney, Agent, or Firm* — Lawrence D. Hazelton

(57) ABSTRACT

A collision sensor module configured to be attached to a surface of a vehicle. The module includes a collision sensor circuit board configured to detect acceleration indicative of a vehicle collision event. The exterior of the module is defined by a housing that includes a rigid part and a flexible part. The rigid part is configured to define a wing portion for attaching the rigid part to the surface, provide an underside surface of the rigid part to couple the collision sensor circuit board to the surface in a manner effective for the circuit board to detect when the vehicle is involved in a collision event. The flexible part is configured to sealingly contact the rigid part and the collision sensor circuit board in a manner effective to seal the protective cavity when the rigid part is attached to the surface and thereby protect the collision sensor circuit board.

10 Claims, 3 Drawing Sheets

COLLISION SENSOR HOUSING AND MODULE

CROSS-REFERENCE TO RELATED APPLICATION

This application claims the benefit under 35 U.S.C. §119 (e) of U.S. Provisional Patent Application No. 61/431,545, filed Jan. 11, 2011, the entire disclosure of which is hereby incorporated herein by reference.

TECHNICAL FIELD OF INVENTION

This disclosure generally relates to a housing of a collision sensor module, and more particularly relates to the housing configuration for a collision sensor circuit board where the circuit board is attached to the underside of a rigid part configured so the circuit board is within a protective cavity between the rigid part and a vehicle surface to which the rigid part is attached.

BACKGROUND OF INVENTION

Some automotive air bag control systems include a module that is attached to a vehicle chassis, where the module includes a collision sensor to activate or deploy an air bag during a crash event. In general, the module housing rigidly couples the collision sensor to the vehicle so the collision sensor can readily detect a vehicle collision. What is needed is a low cost module housing that provides adequate protection for the collision sensor from damage by physical impact or exposure to various chemicals.

SUMMARY OF THE INVENTION

In accordance with one embodiment, a collision sensor housing configured to be attached to a surface of a vehicle is provided. The housing includes a rigid part and a flexible part. The rigid part is configured to define a wing portion for attaching the rigid part to the surface. The rigid part is further configured to define a protective cavity between a top portion of the rigid part and the surface such that the top portion is separated from the surface by the wing portion. The protective cavity is configured to receive a collision sensor circuit board. The flexible part is configured to sealingly contact the rigid part and the collision sensor circuit board in a manner effective to seal the protective cavity when the rigid part is attached to the surface and thereby protect the collision sensor circuit board.

In another embodiment, a collision sensor module is provided. The collision sensor module is configured to be attached to a surface of a vehicle. The module includes a collision sensor circuit board, a rigid part and a flexible part. The collision sensor circuit board is configured to detect acceleration indicative of a vehicle collision event. The rigid part is configured to define a wing portion for attaching the rigid part to the surface. The rigid part is further configured to define a protective cavity between a top portion of the rigid part and the surface, wherein the top portion is separated from the surface by the wing portion. The protective cavity is configured to receive the collision sensor circuit board and couple the collision sensor circuit board to the surface in a manner effective for the collision sensor circuit board to detect when the vehicle is involved in a collision event. The flexible part is configured to sealingly contact the rigid part and the collision sensor circuit board in a manner effective to seal the protective cavity when the rigid part is attached to the surface and thereby protect the collision sensor circuit board.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
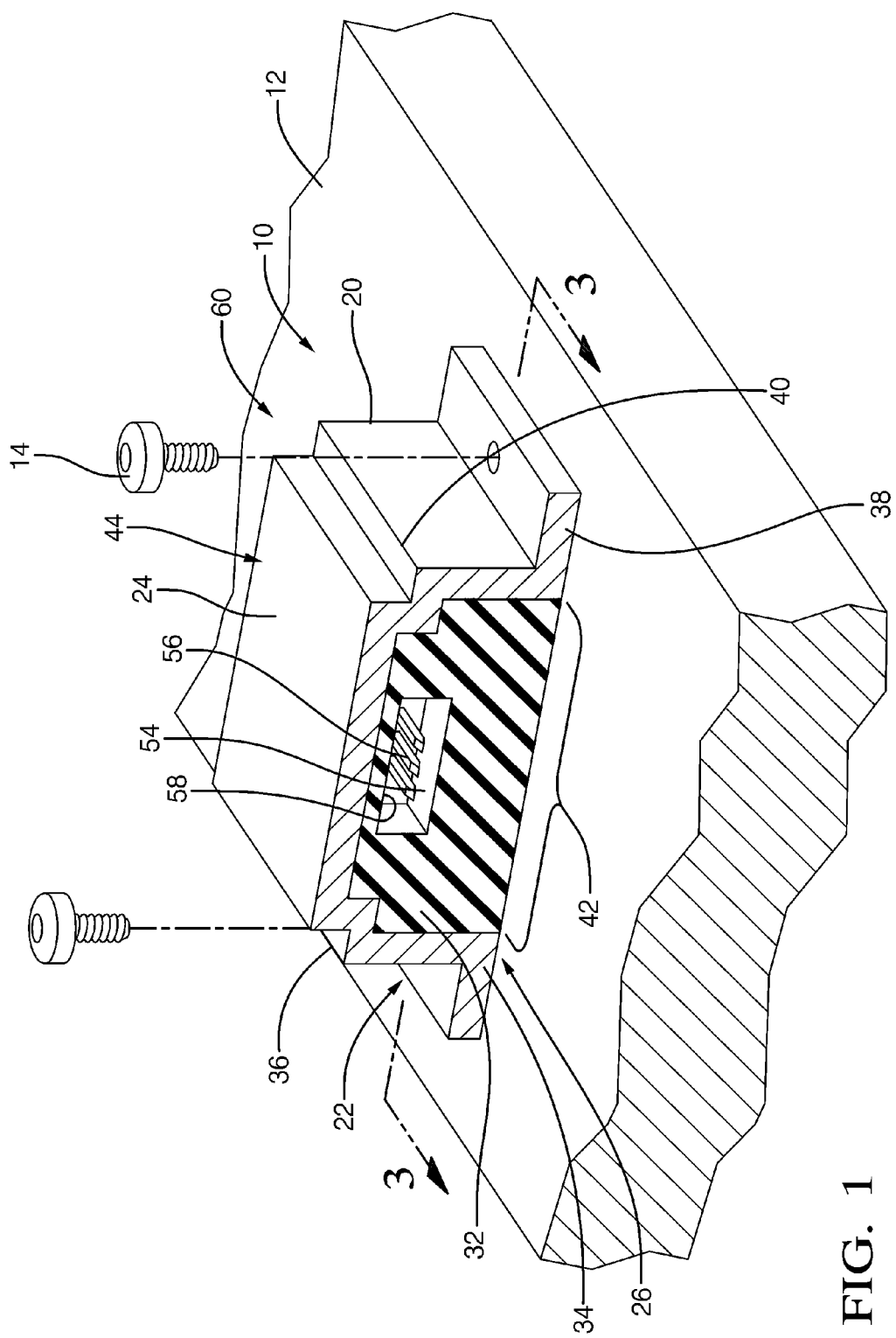
FIG. 1 is a perspective view of collision sensor module configured to be attached to a surface in accordance with one embodiment.

FIG. 1 illustrates a non-limiting example of a collision sensor module 10 configured to be attached to a surface 12 of a vehicle (not shown). As will be recognized by those skilled in the art of collision sensing, the surface 12 may be part of a frame or bumper of the vehicle, or other feature of the vehicle suitable for mounting a collision sensing device such as the module 10. The module 10 may be secured to the surface 12 by module fasteners 14, such as screws, bolts, rivets, or the like, or the module 10 may be secured using an adhesive such as epoxy.

Figure 2:
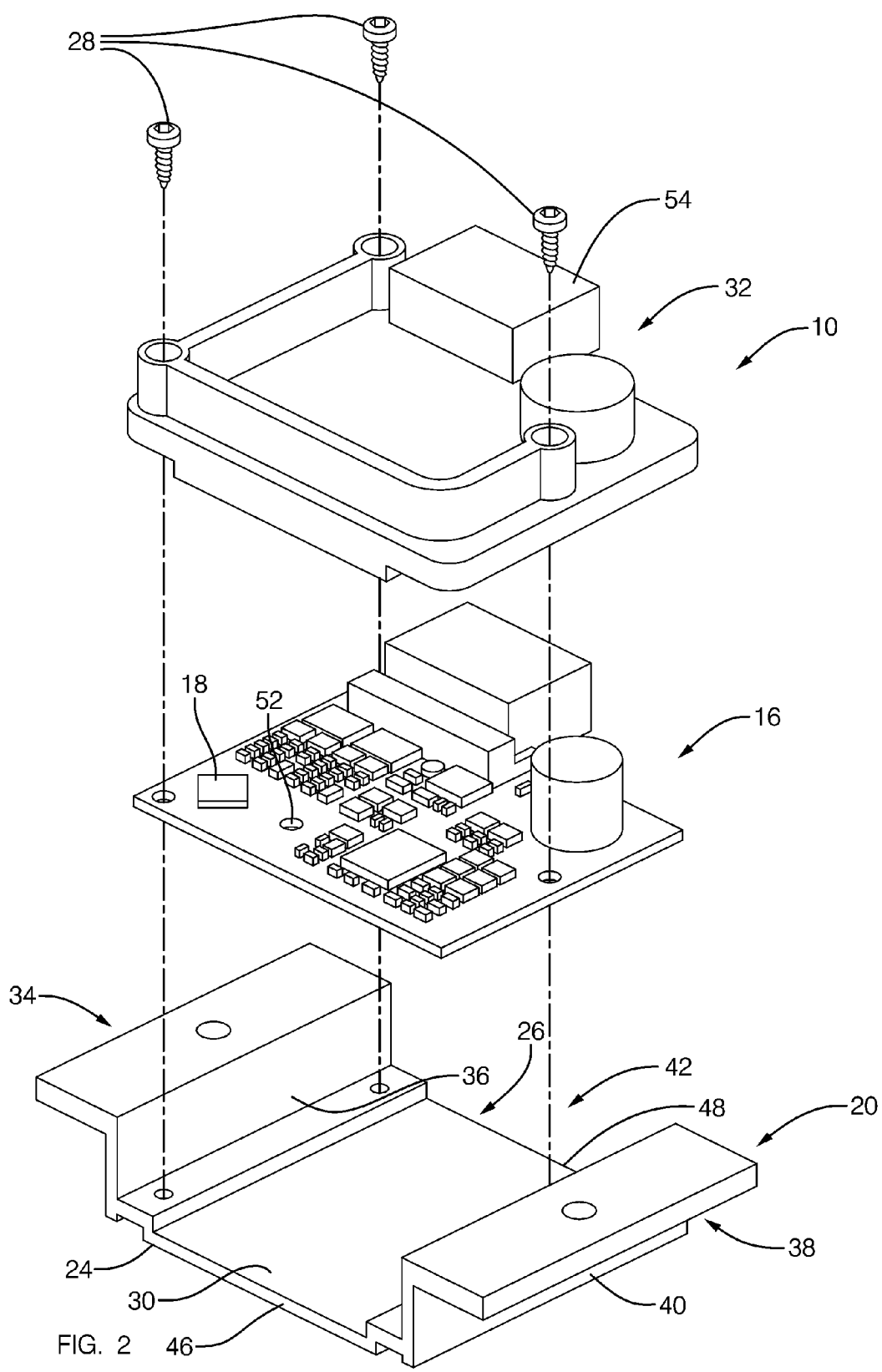
FIG. 2 is an exploded perspective view of the module of FIG. 1 in accordance with one embodiment.

FIG. 2 illustrates an exploded view of the module 10 viewed from the opposite direction shown in FIG. 1, and illustrated without the surface 12. In this non-limiting example, the module 10 includes a collision sensor circuit board 16. In general, the circuit board 16 is configured to detect acceleration indicative of the vehicle being involved in a vehicle collision event. The circuit board 16 may include an accelerometer 18 such as an ADXL278 accelerometer manufactured by Analog Devices Inc., and other electrical components known to those skilled in the art. The accelerometer 18 and other electrical components may be attached to the circuit board 16 using solder or conductive epoxy.

Referring to FIGS. 1 and 2, the module 10 may include a rigid part 20 configured to define a wing portion 22 for attaching the rigid part 20 to the surface 12. The rigid part 20 may include a top portion 24 that cooperates with the wing portion 22 to define a protective cavity 26 generally located between the top portion 24 of the rigid part 20 and the surface 12 when the rigid part 20 is fastened to the surface 12. By this arrangement, the top portion 24 is separated from the surface 12 by the wing portion 22 such that the protective cavity 26 has room to receive the collision sensor circuit board 16. The rigid part 20 is generally configured to be crush resistant so objects residing within the protective cavity 26 when the rigid part 20 is attached to the surface 12 are protected from mechanical damage by way of crushing or impact. As used herein, crush resistant means that the rigid part 16 will typically not deform when subjected to a crushing type force of less than 1000 Newton (N).

The rigid part 20 in this example is shaped so that the rigid part 20 is readily formed of aluminum using known extrusion methods. By way of example and not limitation, in order for the rigid part 16 to withstand the crushing force described above when the rigid part 16 is formed by aluminum extrusion and sized to have a protective cavity of 56 millimeters by 67 millimeters by 20 millimeters, the rigid part 16 preferably has a wall thickness of about 2 millimeters. Alternatively, the rigid part 20 may be formed of sheet metal that is bent to provide the shape of the rigid part 16 illustrated.

The module 10 may also include circuit board fasteners 28, such as screws, or rivets, or the like for securing the circuit board 16 to an underside 30 of the rigid part 20. In general, the arrangement is such that the collision sensor circuit board 16 is coupled to the surface 12 so the accelerometer 18 is able to detect when the vehicle is involved in a vehicle collision event. The arrangement illustrated has the circuit board 16 secured to the underside 30 of the rigid part 20 so the circuit board 16 is protected and is rigidly coupled to the vehicle.

The module 10 may also include a flexible part 32 configured to sealingly contact the rigid part 20 and the collision sensor circuit board 16 in a manner effective to seal the protective cavity 26 when the rigid part is attached to the surface 12 and thereby protect the collision sensor circuit board 16 from exposure to contaminants such as dirt, moisture, or corrosive chemicals. The flexible part 32 may be formed of an elastomeric material, for example silicone rubber, neoprene, or ethylene propylene diene Monomer (EPDM), however it is recognized that other materials may be suitable. It has been suggested that the elastomeric material preferably has a durometer of 65-85 Shore A. If the elastomeric material is too soft, it's inablility to hold shape during manufacturing and subsequent handling may be problematic. If the elastomeric material is too hard, the risk of damage to the circuit board 16 during handling and when installed in a vehicle undesirably increases.

In one embodiment, the circuit board fasteners 28 may secure the flexible part 32 to the rigid part 20. In another embodiment described in more detail below, the circuit board fasteners 28 may only secure the circuit board 16 to the rigid part 20, and the flexible part 32 may include features that couple the flexible part 32 to the circuit board 16.

The non-limiting example illustrated in FIGS. 1 and 2 shows the wing portion 22 having a first wing portion 34 configured to couple a first edge 36 of the top portion 24 to the surface 12, and a second wing portion 38 configured to couple a second edge 40 of the top portion 24 opposite the first edge 36 to the surface 12. As such, the arrangement of the top portion 24, the first wing portion 24, and the second wing portion 38 define a first opening 42 and a second opening 44 along opposite edges 46, 48 of the top portion 24 between the first edge 36 and the second edge 40.

Figure 3:
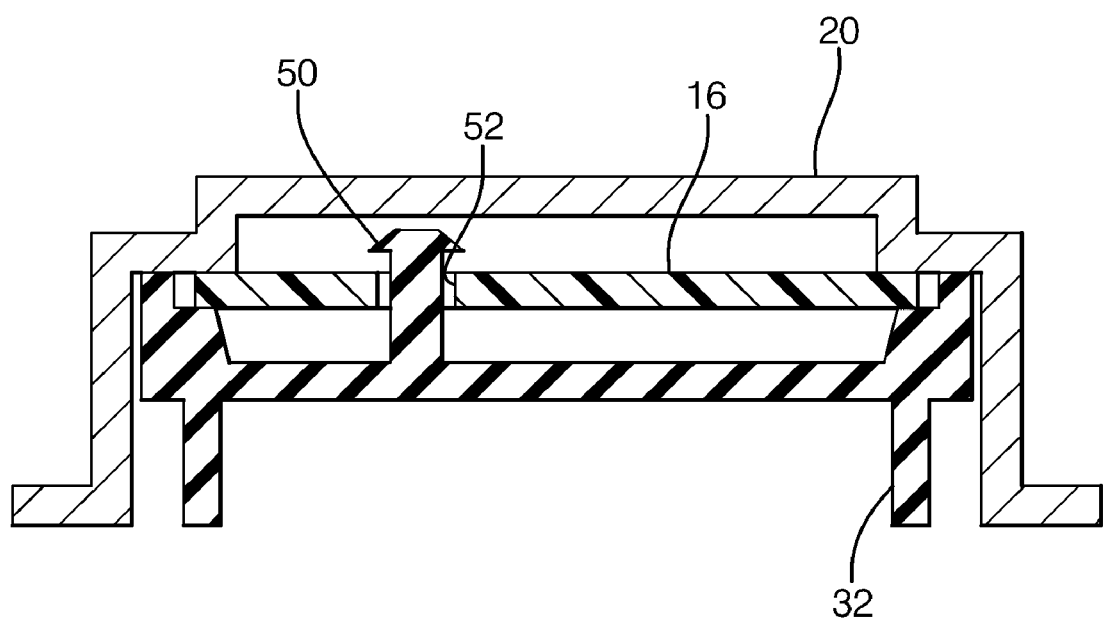
FIG. 3 is a sectional view of the module of FIG. 1 in accordance with one embodiment.

FIG. 3 illustrates a cut-away side view of the module 10 that illustrates a non-limiting example of the flexible part 32 that includes a member 50 configured to engage with a receiving hole 52 in the collision sensor circuit board 16 in a manner effective to hold the flexible part 32 proximate to the collision sensor circuit board 16 when the rigid part is not attached to the surface 12.

Referring again to FIGS. 1-2, the collision sensor circuit board 16 may include a connector header 54 configured so one or more connector pins 56 are exposed and available for contact with a connector (not shown) from outside the module 10, and the flexible part 32 is configured to sealingly contact a perimeter surface 58 of the connector header 54.

Accordingly, a module 10, and a collision sensor housing 60 comprising the rigid part 20 and the flexible part 32 is provided. The rigid part 20 is configured to define a crush resistant protective cavity 26 when it is attached to the vehicle, and is oriented such that a circuit board 16 with an accelerometer 18 is secured to the underside 30 of the rigid part 20 providing for a protective covering when the module 10 is installed in the vehicle on the surface 12. The module 10 also includes a flexible part 32 formed of, for example, an inexpensive molded rubber or elastomeric material that may be secured without fasteners by forming a connector port in the flexible part 32 to stabilize positioning of the flexible part 32 during assembly of the module 10. The flexible part 32 may also include a member 50 having a push through-pull through type shape that may be elastically forced through a receiving hole 52 in the circuit board 16. This arrangement provides cost savings for producing a rigid part 20 that effectively transmits energy during a crash event, as well as eliminates the requirement for fasteners to attach the flexible part 32 to the module 10. Overall complexity is reduced by incorporating the aluminum extrusion directionally to provide crush protection in the vehicle with the orientation of the circuit board 16 being vertically opposed to the typical assembly direction. Now the rigid part 20 has the capability to protect the circuit board 16 instead of having to provide either a stronger plastic or thicker metallic cover found in typical prior designs. The flexible part 32 may provide the necessary contamination prevention and is capable of being produced in a sheet style matrix of parts that have tear away interconnects allowing for cost efficient molding and material handling in the assembly facility.

While this invention has been described in terms of the preferred embodiments thereof, it is not intended to be so limited, but rather only to the extent set forth in the claims that follow.

We claim:

1. A collision sensor housing configured to be attached to a surface of a vehicle, said housing comprising:
a rigid part configured to define a wing portion for attaching the rigid part to the surface, said rigid part further configured to define a protective cavity between a top portion of the rigid part and the surface, wherein the top portion is separated from the surface by the wing portion, wherein said protective cavity is configured to receive a collision sensor circuit board; and
a flexible part configured to sealingly contact the rigid part and the collision sensor circuit board in a manner effective to seal the protective cavity when the rigid part is attached to the surface and thereby protect the collision sensor circuit board, wherein the flexible part is formed of elastomeric material being one of silicone rubber, neoprene, and ethylene propylene diene Monomer (EPDM), and characterized as having a durometer of 65-85 Shore A.

2. The housing in accordance with claim 1, wherein the collision sensor circuit board is coupled to the surface via the rigid part in a manner effective for the collision sensor circuit board to detect when the vehicle is involved in a collision event.

3. The housing in accordance with claim 2, wherein the rigid part defines an underside of the top portion facing the surface, and the collision sensor circuit board is attached to the underside.

4. The housing in accordance with claim 1, wherein the wing portion includes a first wing portion configured to couple a first edge of the top portion to the surface, and a second wing portion configured to couple a second edge of the top portion opposite the first edge to the surface, whereby the top portion, the first wing portion, and the second wing portion are arranged to define a first opening and a second opening along opposite edges of the top portion between the first edge and the second edge.

5. The housing in accordance with claim 1, wherein the rigid part is formed of aluminum by way of extrusion.

6. The housing in accordance with claim 1, wherein the flexible part includes a member configured to engage with a receiving hole in the collision sensor circuit board in a manner effective to hold the flexible part proximate to the collision sensor circuit board when the rigid part is not attached to the surface.

7. A collision sensor module configured to be attached to a surface of a vehicle, said module comprising:
- a collision sensor circuit board configured to detect acceleration indicative of a vehicle collision event;
- a rigid part configured to define a wing portion for attaching the rigid part to the surface, said rigid part further configured to define a protective cavity between a top portion of the rigid part and the surface, wherein the top portion is separated from the surface by the wing portion, wherein said protective cavity is configured to receive the collision sensor circuit board and couple said collision sensor circuit board to the surface in a manner effective for the collision sensor circuit board to detect when the vehicle is involved in a collision event; and
- a flexible part configured to sealingly contact the rigid part and the collision sensor circuit board in a manner effective to seal the protective cavity when the rigid part is attached to the surface and thereby protect the collision sensor circuit board, wherein the flexible part is formed of elastomeric material being one of silicone rubber, neoprene, and ethylene propylene diene Monomer (EPDM), and characterized as having a durometer of 65-85 Shore A.

8. The module in accordance with claim 7, wherein the wing portion includes a first wing portion configured to couple a first edge of the top portion to the surface, and a second wing portion configured to couple a second edge of the top portion opposite the first edge to the surface, whereby the top portion, the first wing portion, and the second wing portion are arranged to define a first opening and a second opening along opposite edges of the top portion between the first edge and the second edge.

9. The module in accordance with claim 7, wherein the flexible part includes a member configured to engage with a receiving hole in the collision sensor circuit board in a manner effective to hold the flexible part proximate to the collision sensor circuit board when the rigid part is not attached to the surface.

10. The module in accordance with claim 7, wherein the collision sensor circuit board includes a connector header configured so one or more connector pins are exposed and available for contact with a connector from outside the module, and the flexible part is configured to sealingly contact a perimeter surface of the connector header.

* * * * *